(12) United States Patent
Fu et al.

(10) Patent No.: US 11,446,624 B2
(45) Date of Patent: Sep. 20, 2022

(54) CYCLIC METAL DEACTIVATION UNIT DESIGN FOR FCC CATALYST DEACTIVATION

(71) Applicant: BASF Corporation, Florham Park, NJ (US)

(72) Inventors: James C. Fu, West Windsor, NJ (US); Chandrashekhar Kelkar, Florham Park, NJ (US); Roman Matlin, Berkeley Heights, NJ (US); Johannes Mang, Eppelheim (DE); Andreas Mueller, Florsheim-Dalsheim (DE)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 17/000,955

(22) Filed: Aug. 24, 2020

(65) Prior Publication Data

US 2020/0384432 A1 Dec. 10, 2020

Related U.S. Application Data

(62) Division of application No. 16/096,895, filed as application No. PCT/US2017/029825 on Apr. 27, 2017, now Pat. No. 10,828,614.

(Continued)

(51) Int. Cl.
*B01J 8/26* (2006.01)
*C10G 11/18* (2006.01)
(Continued)

(52) U.S. Cl.
CPC .............. *B01J 8/26* (2013.01); *B01J 8/0015* (2013.01); *B01J 8/1827* (2013.01); *B01J 8/1836* (2013.01);
(Continued)

(58) Field of Classification Search
None
See application file for complete search history.

(56) References Cited

U.S. PATENT DOCUMENTS 2,429,721 A * 10/1947 Jahnig ...................... B01J 8/189
422/223
2,434,567 A * 1/1948 Jahnig ........................ B01J 8/26
422/223

(Continued)

FOREIGN PATENT DOCUMENTS

| CN | 103814114 A | 5/2014 |
| JP | 2010253469 A | 11/2010 |
| RU | 2417246 C1 | 4/2011 |

OTHER PUBLICATIONS

International Search Report and Written Opinion in International Application No. PCT/US2017/029825, dated Jul. 11, 2017. (10 pages).

(Continued)

*Primary Examiner* — Tam M Nguyen
(74) *Attorney, Agent, or Firm* — Lowenstein Sandler LLP

(57) ABSTRACT

A cyclic metals deactivation system unit for the production of equilibrium catalyst materials including a cracker vessel configured for cracking and stripping a catalyst material; and a regenerator vessel in fluid communication with the cracker vessel, the regenerator vessel configured for regeneration and steam deactivation of the catalyst material.

8 Claims, 6 Drawing Sheets

Related U.S. Application Data

(60) Provisional application No. 62/329,374, filed on Apr. 29, 2016.

(51) Int. Cl.
  *C10G 11/00* (2006.01)
  *B01J 8/00* (2006.01)
  *B01J 8/18* (2006.01)
  *B01J 38/04* (2006.01)

(52) U.S. Cl.
  CPC ............... *B01J 38/04* (2013.01); *C10G 11/00* (2013.01); *C10G 11/18* (2013.01); *C10G 11/182* (2013.01); *B01J 2208/0092* (2013.01); *B01J 2208/00752* (2013.01); *B01J 2208/00761* (2013.01); *B01J 2208/00769* (2013.01); *C10G 2300/70* (2013.01); *C10G 2300/706* (2013.01)

(56) References Cited

U.S. PATENT DOCUMENTS

| | | | | |
|---|---|---|---|---|
| 2,454,466 A * | 11/1948 | Earl | ................ | B01J 8/1863 502/41 |
| 2,487,132 A * | 11/1949 | Hemminger | ........... | C10G 11/18 208/120.25 |
| 2,883,332 A * | 4/1959 | Wickham | ................ | B01J 8/28 208/78 |
| 3,226,335 A * | 12/1965 | Humes | ................ | B01J 21/20 502/22 |
| 3,267,024 A * | 8/1966 | Vaell | ................ | B01J 8/12 422/216 |
| 3,378,483 A * | 4/1968 | Durney | ................ | B01J 8/26 700/282 |
| 4,092,722 A * | 5/1978 | Hofferber | ............ | C10G 11/187 208/159 |
| 4,377,470 A | 3/1983 | Hettinger et al. | | |
| 4,797,262 A * | 1/1989 | Dewitz | ................ | C10G 11/18 422/142 |
| 5,059,305 A | 10/1991 | Sapre | | |
| 6,503,460 B1 * | 1/2003 | Miller | ................ | C10G 11/182 422/142 |
| 2003/0124034 A1 * | 7/2003 | Wu | ................ | B01J 8/0055 422/139 |
| 2004/0004023 A1 | 1/2004 | Sughrue et al. | | |
| 2005/0274648 A1 * | 12/2005 | Goldstein | ................ | B01J 8/12 208/134 |
| 2007/0197846 A1 | 8/2007 | Beech et al. | | |
| 2010/0174125 A1 | 7/2010 | Tyler et al. | | |
| 2010/0326888 A1 * | 12/2010 | Xu | ................ | B01J 29/90 502/65 |
| 2012/0083404 A1 * | 4/2012 | Palmas | ................ | B01J 29/90 502/38 |
| 2013/0172173 A1 | 7/2013 | Mukthiyar et al. | | |
| 2013/0270157 A1 * | 10/2013 | Ferrara | ................ | C10G 75/04 208/48 AA |
| 2018/0178179 A1 * | 6/2018 | Davydov | ............... | B01J 8/1881 |
| 2018/0320891 A1 * | 11/2018 | Panchai | ................ | B01J 8/28 |
| 2018/0345267 A1 * | 12/2018 | Khan | ................ | B01J 8/1818 |

OTHER PUBLICATIONS

Lerner, B. et al: "Improved methods for Testing and Assessing Deactivation from Vanadium Interaction with FCC Catalyst," Am. Chem. Soc. 40(3):487-490 (1995).

Notice of Allowance in U.S. Appl. No. 16/096,895, dated Jul. 2, 2020.

Quintana-Solorzano, R. et al: "Cyclic Deactivation with Steam of Metallated Cracking Catalysts: Catalytic Testing at the Bench Scale and the Pilot Scale," Topics in Catalysts 54(8-9):547-560 (2011).

Yannick, M. et al: "Single and combined Fluidized Catalytic Cracking (FCC) catalyst deactivation by iron and calcium metal-organic contaminants," Applied Catalysis A: General 469:451-465 (2014).

* cited by examiner

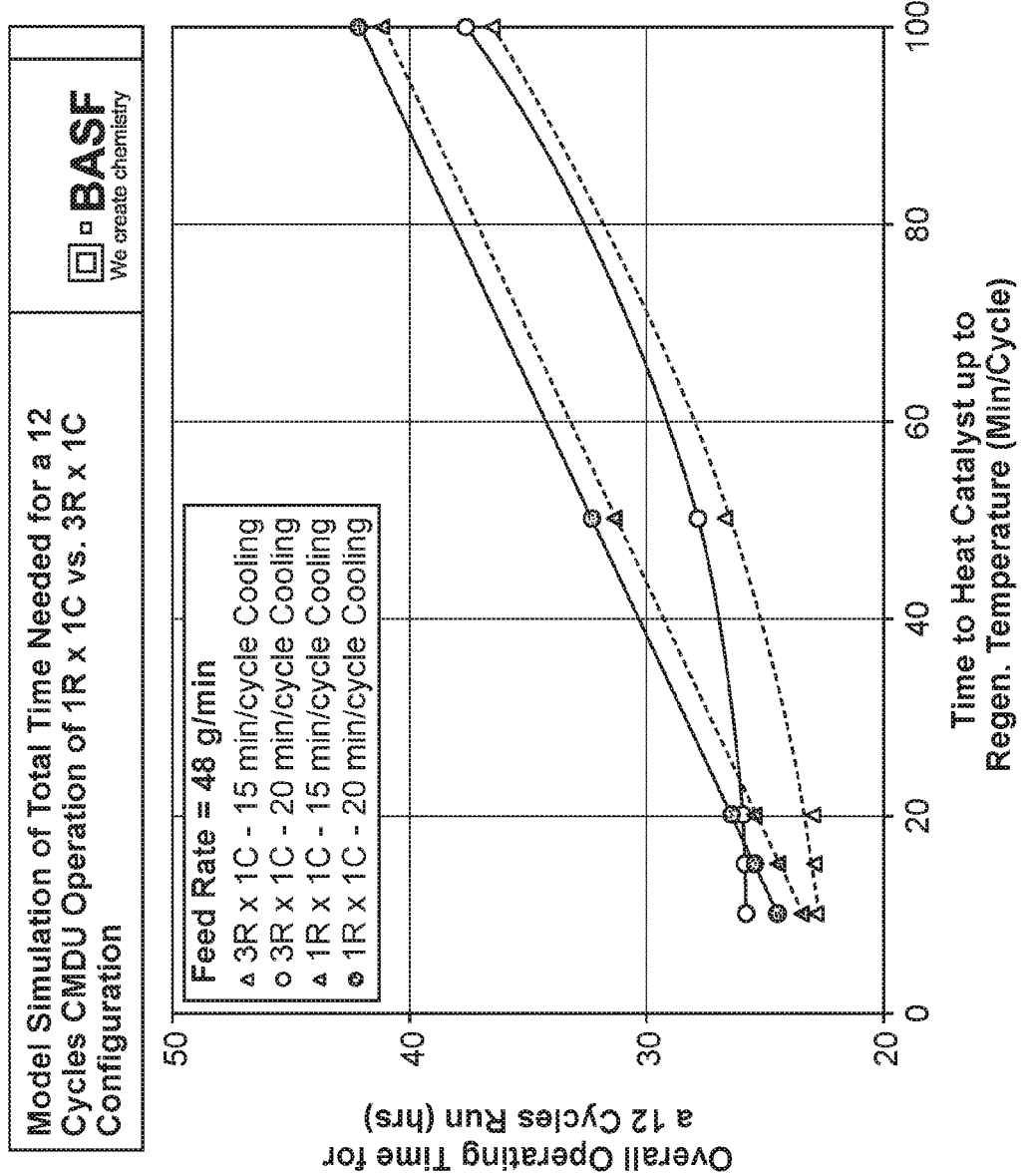

CYCLIC METAL DEACTIVATION UNIT DESIGN FOR FCC CATALYST DEACTIVATION

CROSS-REFERENCE TO RELATED APPLICATIONS

This application is a divisional application of U.S. patent application Ser. No. 16/096,895, filed on Oct. 26, 2018, which is a U.S. National Phase Application under 35 U.S.C. § 371 of International Application No. PCT/US2017/029825, filed on Apr. 27, 2017, which claims the benefit of priority to U.S. Provisional Patent Application No. 62/329,374, filed on Apr. 29, 2016, which are each incorporated herein by reference in their entireties for any and all purposes.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The present invention relates generally to the field of fluid catalytic cracking (FCC) units (e.g., reactor and regenerator devices). More specifically, the present invention relates to a cyclic metals deactivation unit system for an FCC catalyst deactivation device. More specifically still, the present invention relates to a cyclic metals deactivation unit system for an FCC catalyst deactivation device that uses separate vessels (e.g., cracker and regenerator) to crack and regenerate a catalyst within the system.

FCC units may be used in industrial applications for producing gasoline, middle distillate (e.g., light cycle oil (LCO)), and light petroleum gas (LPG), and additionally, for reducing the amount of residue in crude oil, converting the residue into lighter, more valuable products, such as light hydrocarbons, through the process of cracking. FCC catalyst deactivation devices may be used in experimental applications to reproduce the environment to which a catalyst is exposed in a commercial FCC unit.

To predict what may happen in a commercial FCC unit, experiments involving catalyst deactivation aim to mimic what may occur to a catalyst in an FCC unit over a relatively long period of time (e.g., over a period of many weeks) in an accelerated amount of experimental time (e.g., over a period of many hours). To accomplish this, experiments may involve FCC catalyst deactivation devices that can be used to produce a simulated equilibrium catalyst (Ecat) from fresh catalyst to match the commercial Ecat used in FCC units. Some FCC catalyst deactivation devices use a single vessel, in which a catalyst is metallated and deactivated in the one vessel where cracking and regeneration/hydrothermal deactivation conditions of an FCC process are simulated in an alternative fashion, repeatedly. However, using a single vessel creates thermal stress in the vessel due to repetitive temperature changes required in the process. Thermal stress in the vessel over a period of time may result in shorter life of the vessel. Additionally, in a single vessel configuration, the amount of time to heat up and cool down the vessel results in relatively long periods of non-productive time in the experimental process. Poor sample efficiency may result from this lost time.

SUMMARY

One embodiment of the invention relates to a cyclic metals deactivation system unit for the production of equilibrium catalyst materials. The cyclic metals deactivation system unit includes a cracker vessel configured for cracking and stripping a catalyst material and a regenerator vessel in fluid communication with the cracker vessel, the regenerator vessel configured for regeneration and steam deactivation of the catalyst material.

Another embodiment of the invention relates to a method of catalyst deactivation. The method includes cracking, by a cracker vessel, a catalyst; regenerating, by a regenerator vessel, the catalyst; distributing, by an age distribution vessel, the catalyst based at least in part on the age of the catalyst; and transporting, by one or more dip tubes, the catalyst between the cracker vessel, regenerator vessel, and age distribution vessel to deactivate the catalyst.

BRIEF DESCRIPTION OF THE DRAWINGS

FIG. 1C is a comparative graphical representation of the operational runtime of two cyclic metal deactivation systems, according to an exemplary embodiment.

DETAILED DESCRIPTION

Figure 1:
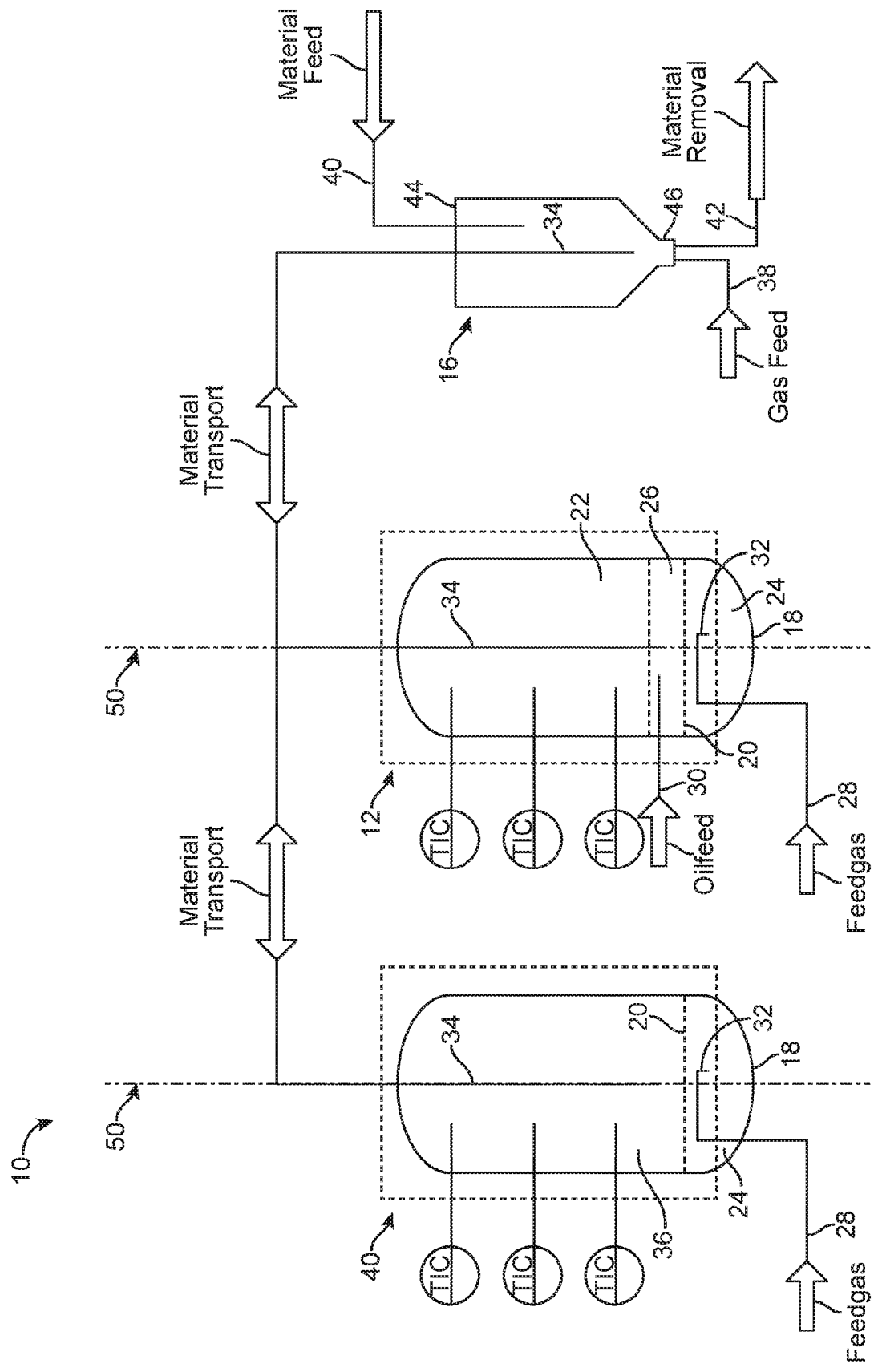
FIG. 1 is a schematic diagram of a cyclic metal deactivation unit, according to an exemplary embodiment.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, the term "fresh catalyst" denotes a catalyst that has never been exposed to reactants at reaction conditions, such as new catalyst received from a vendor.

The term "spent catalyst" denotes any catalyst that has less activity at the same reaction conditions (e.g., temperature, pressure, inlet flows) than the catalyst had when it was originally exposed to the process. This can be due to a number of reasons, several non-limiting examples of causes of catalyst deactivation are coking or carbonaceous material sorption or accumulation, metals (and ash) sorption or accumulation, attrition, morphological changes including changes in pore sizes, cation or anion substitution, and/or chemical or compositional changes.

The term "regenerated catalyst" denotes a catalyst that had become spent, as defined above, and was then subjected to a process that increased its activity, as defined above, to a level greater than it had as a spent catalyst. This may involve, for example, reversing transformations or removing contaminants outlined above as possible causes of reduced activity. The regenerated catalyst typically has an activity that is equal or less than the fresh catalyst activity.

Referring generally to the FIGURES, a cyclic metal deactivation system and components thereof are shown, according to an exemplary embodiment. The cyclic metal deactivation system may be used to produce E-cat material in an industrial or experimental setting. The cyclic metal deactivation system includes a cracker vessel, a regenerator vessel, and an age distribution vessel.

Beneficially, using two or more vessels for cyclic metal deactivation provides a number of advantages over conventional deactivation systems. For example, using two or more vessels for cyclic metal deactivation may significantly reduce the thermal stress to each of the vessels relative to deactivation systems that use a single vessel for all steps of the deactivation process. The change in temperature between steps in the deactivation process requires the vessel of a conventional deactivation system to heat up and cool down between process steps. The repetitive change in temperature additionally results in poor sample efficiency due to long non-productive periods while the vessel is heating up and cooling down. Additionally, the cyclic metal deactivation system of the present disclosure includes an improved fluidization homogeneity through use of a porous plate located in each of the cracker and regenerator vessels. Due to redirection of incoming gas flow the porous plate acts to improve fluidization homogeneity relative to a conventional deactivation system. These and other advantages of a cyclic metal deactivation system with multiple vessels are described in greater detail below.

Referring now to FIG. 1, a cyclic metal deactivation system is shown, according to an exemplary embodiment. The cyclic metal deactivation system 10 is shown as a three vessel system, having a cracker vessel 12, a regenerator vessel 14, and an age distribution vessel 16. In some embodiments, the cyclic metal deactivation system 10 may include only the cracker vessel 12 and the regenerator vessel 14. In other embodiments, the age distribution vessel 16 may additionally be included. In further embodiments, the system 10 includes more than one regenerator vessel 14.

The cracker vessel 12 is shown as a cylindrical vessel having a bottom 18, a fluidization chamber 22, a gas distribution chamber 24, and a porous plate 20 intermediately positioned between the fluidization chamber 22 and the gas distribution chamber 24, separating the two chambers. The fluidization chamber 22 may include an oil feed 30, where preheated feedstock that may consist of long-chain hydrocarbon molecules, combined with recycled slurry oil, enters the cracker vessel 12 as shown in FIG. 1. In some embodiments, the oil feed 30 may feed oil into the cracker vessel 12 using a single oil injection nozzle, positioned horizontally relative to the vessel 12.

The feedstock is shown to enter the fluidization chamber 22 near or into a material bed 26. The fluidization chamber 22 may be configured to vaporize and crack the feedstock into smaller molecules of vapor by contacting and mixing with a hot, powdered catalyst. The hydrocarbon vapors fluidize the powdered catalyst, which acts to fluidize the material bed 26.

The gas distribution chamber 24 may include a gas feed 28, a gas redirector 32, and a bottom 18. Gas may enter the gas distribution chamber 24 through the gas feed 28 and may be redirected toward the bottom 18 by the gas redirector 32.

The gas redirector 32 may be structured to redirect incoming gas from the gas feed 28 to the bottom 18 of the gas distribution chamber 24, where the incoming gas may be distributed across the cross-sectional area of the bottom 18. In this regard, the gas redirector 32 may be positioned at or near a vertical axis 50 of the cracker vessel 12, such that the gas may be distributed across the bottom 18 evenly.

The porous plate 20 may be configured as a sieve plate with a plurality of apertures in the plate 20. The size of the apertures may be customized. According to an exemplary embodiment, the size of the apertures are configured to allow the particles of feedstock to pass through the apertures, while preventing the particles of catalyst from passing through the apertures. Thus, the porous plate 20 may separate catalyst and feedstock. The porous plate 20 may be structured to provide contact between any down-flowing catalyst in the fluidization chamber 22 and up-flowing gas (e.g., steam) in the gas distribution chamber 24. In this regard, the porous plate 20 may act as a stripper of the catalyst to rid the catalyst of any hydrocarbon vapors before returning the catalyst to any other components in the cyclic metal deactivation system 10 (e.g., to the regenerator vessel 14). The porous plate 20 may be removable and replaceable as described further herein with regard to FIG. 3.

The cyclic metal deactivation system 10 is shown as having a dip tube 34 for each vessel. The one or more dip tubes 34 may be structured to pneumatically transport catalyst material between each of the vessels. Transportation of catalyst material occurs due to pressure differences and volume flow between each of the vessels. Accordingly, the vessel that is sending the catalyst material may have a higher pressure, thus having higher volume flow, than a vessel that is receiving the catalyst material. As an example, if catalyst is being transported from the cracker vessel 12 to the regenerator vessel 14, the cracker vessel 12 will be at a higher pressure at that point in the process relative to the regenerator vessel 14, causing the catalyst to flow to the regenerator vessel 14.

The catalyst material, including spent catalyst, may be sent to a regenerator vessel 14 (e.g., a regeneration unit) where the spent catalyst is regenerated by combusting any residual (e.g., remaining, left-over, etc.) carbonaceous material to produce mainly regenerated catalyst and ash residue of the combusted carbonaceous material. In some embodiments, a portion of the spent catalyst may be sent back to the cracker vessel 12 without being regenerated, or may be discarded. An oxygen-carrying gas, such as air, may be introduced into the regenerator vessel 14 to regenerate the spent catalyst and combust the remaining carbonaceous material in the regenerator vessel 14.

The regenerator vessel 14 may be structured to burn off any deposited coke on the catalyst, supply the heat requirements of the process, and restore the catalyst's activity. In some embodiments, the regenerator vessel 14 may be similar in configuration to the cracker vessel 12. Accordingly, the regenerator vessel 14 is shown as a cylindrical vessel having a bottom 18 and a porous plate 20. As shown in FIG. 1, the regenerator vessel also includes two chambers, a gas redistribution chamber 24 and a catalyst regeneration chamber 36.

The gas redistribution chamber 24, enclosed by the bottom 18 and the porous plate 20, may be similarly configured as the gas redistribution chamber 24 in the cracker vessel 12. Accordingly, the gas redistribution chamber 24 includes a gas feed 28, a gas redirector 32, and a bottom 18. Gas may enter the gas distribution chamber 24 through the gas feed 28 and may be redirected toward the bottom 18 by the gas redirector 32.

As mentioned, the catalyst regeneration chamber 36 may be structured to receive spent catalyst from other components of the cyclic metals deactivation unit 10 (e.g., from the cracker vessel 12), via the pneumatic transport system and one or more dip tubes 34, and regenerate that catalyst by burning off any deposited coke that may be deposited on the catalyst. The regenerated catalyst can then be recycled through the cyclic metals deactivation system 10 by reentering the cracker vessel 12.

Beneficially, and as mentioned above, each of the cracker vessel 12 and the regenerator vessel 14 may be maintained at constant temperatures. The process conditions of each of the vessels may be maintained as follows. In some embodiments, the cracker vessel 12 may be maintained at a maximum operating pressure of approximately 10 psi (0.7 bar) and at a maximum operating temperature of approximately 1000 F (538 C). Additionally, in some embodiments, the regenerator vessel 14 may be maintained at a maximum operating pressure of approximately 10 psi (0.7 bar) and at a maximum operating temperature of approximately 1650 F (899 C). In other embodiments, the vessels may be maintained at different constant or variable temperatures sufficient for the processes within the cyclic metals deactivation system 10.

The age distribution vessel 16 is shown as having a gas feed 38, a material feed 40, and a material removal 42. The age distribution vessel 16 additionally utilizes one or more dip tubes 34 for transport of catalyst similar to the regenerator vessel 14 and the cracker vessel 12. The age distribution vessel 16 may introduce catalyst to the cyclic metals deactivation system 10 through the material feed 40. The age distribution vessel 16 may additionally remove catalyst from the system 10 through the material removal 42.

The age distribution vessel 16 is shown as having a top portion 44 and a bottom portion 46, wherein the catalyst existing within the system 10 is distributed within the age distribution vessel 16. In some embodiments, the top portion 44 may be cylindrical in shape and the bottom portion may be conical in shape to facilitate removal of catalyst material. As an example, older spent catalyst may settle to the bottom portion 46 of the vessel 16, whereas fresher catalyst may be near the top portion 44 of the vessel 16. The bottom portion 46 may include one or more outlets, such as the material removal 42. The top portion 44 may include one or more inlets, such as the material feed 40. To further illustrate, as older catalyst moves toward the bottom portion 46, the catalyst may be removed through the material removal 42 and newer catalyst (e.g., fresh catalyst, regenerated catalyst, a combination thereof) replaces the older catalyst through the material feed 40 at or near the top portion 44 of the vessel 16.

Figure 1A:
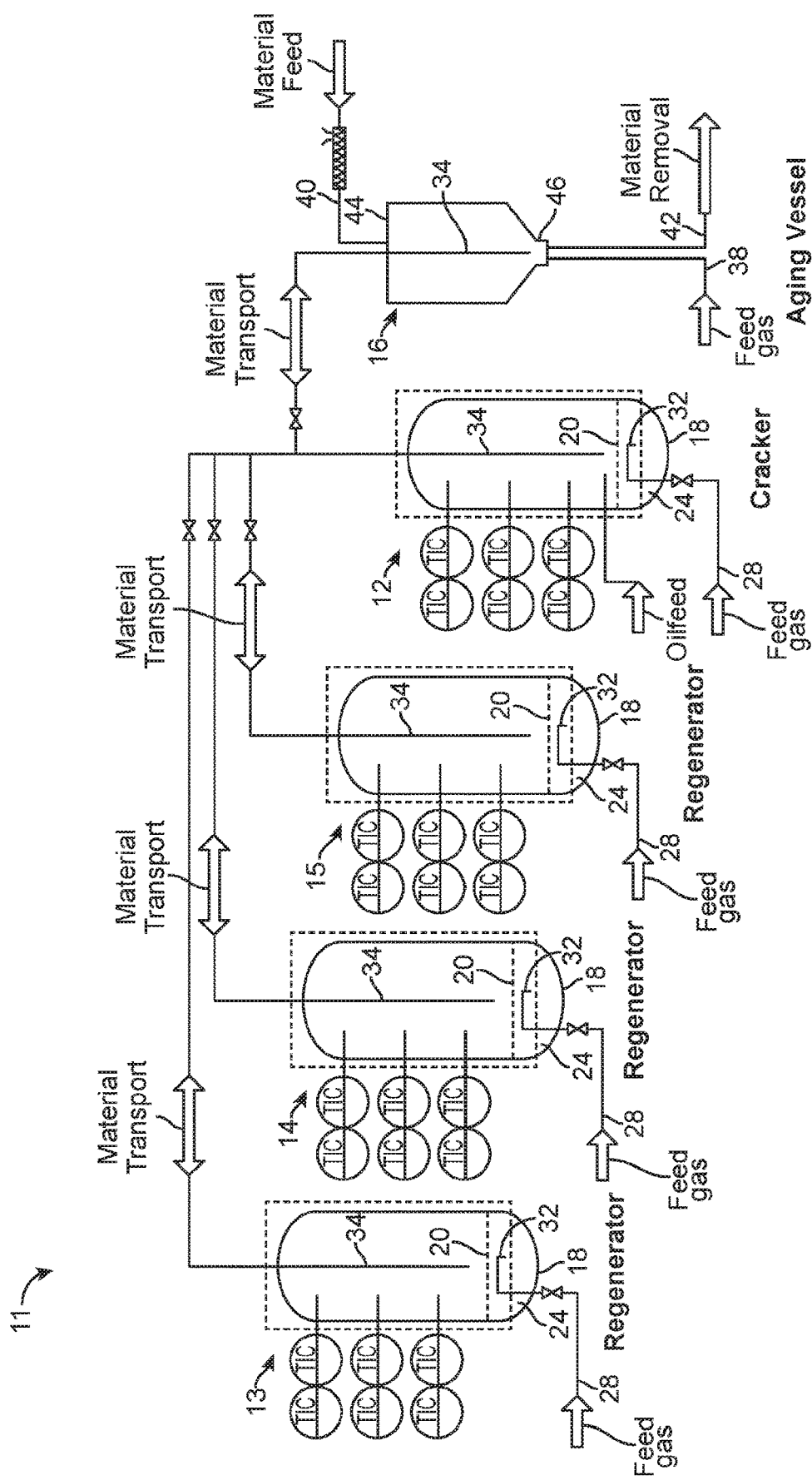
FIG. 1A is a schematic diagram of a cyclic metal deactivation unit, according to an exemplary embodiment.

Referring now to FIG. 1A, a cyclic metal deactivation system is shown, according to an exemplary embodiment. In this embodiment, the cyclic metal deactivation system 11 is shown as a five vessel system, having a cracker vessel 12, three regenerator vessels 13, 14, 15, and an age distribution vessel 16. In some other embodiments, the cyclic metal deactivation system 11 includes more or less than three regenerator vessels. In some embodiments, the cyclic metal deactivation system 11 may include only the cracker vessel 12 and one regenerator vessel 14. In other embodiments, the age distribution vessel 16 may additionally be included.

The additional regenerator vessels 13, 15 shown in FIG. 1A are structured similarly to the regenerator vessel 14 described with regard to FIG. 1. Thus, the regenerator vessels 13, 15 are structured to burn off any deposited coke on the catalyst, supply the heat requirements of the process, and restore the catalyst's activity. In some embodiments, the regenerator vessels 13, 15 may be similar in configuration to the cracker vessel 12. Accordingly, the regenerator vessels 13, 15 are shown as cylindrical vessels having a bottom 18 and a porous plate 20. As shown in FIG. 1A, the regenerator vessels 13, 15 also include two chambers, a gas redistribution chamber 24, and a catalyst regeneration chamber 36.

Referring to FIG. 1A, the transport of catalyst occurs similarly with two or more regenerator vessels as in the system with one regenerator vessel. The cyclic metal deactivation system 11 uses a dip tube 34 to pneumatically transport catalyst material between each of the vessels. The catalyst material, including spent catalyst, is sent to the regenerator vessel 13, 14, 15 where the spent catalyst is regenerated by combusting any residual carbonaceous material to produce mainly regenerated catalyst and ash residue of the combusted carbonaceous material. In some embodiments, each of the regenerator vessels 13, 14, 15 are configured to transport material (e.g., catalyst) directly to and from the cracker vessel 12, each having a separate material transport connection as shown in FIG. 1A. An oxygen-carrying gas, such as air, may be introduced into the regenerator vessel 13, 14, 15 to regenerate the spent catalyst and combust the remaining carbonaceous material in the regenerator vessel 13, 14, 15.

Figure 1B:
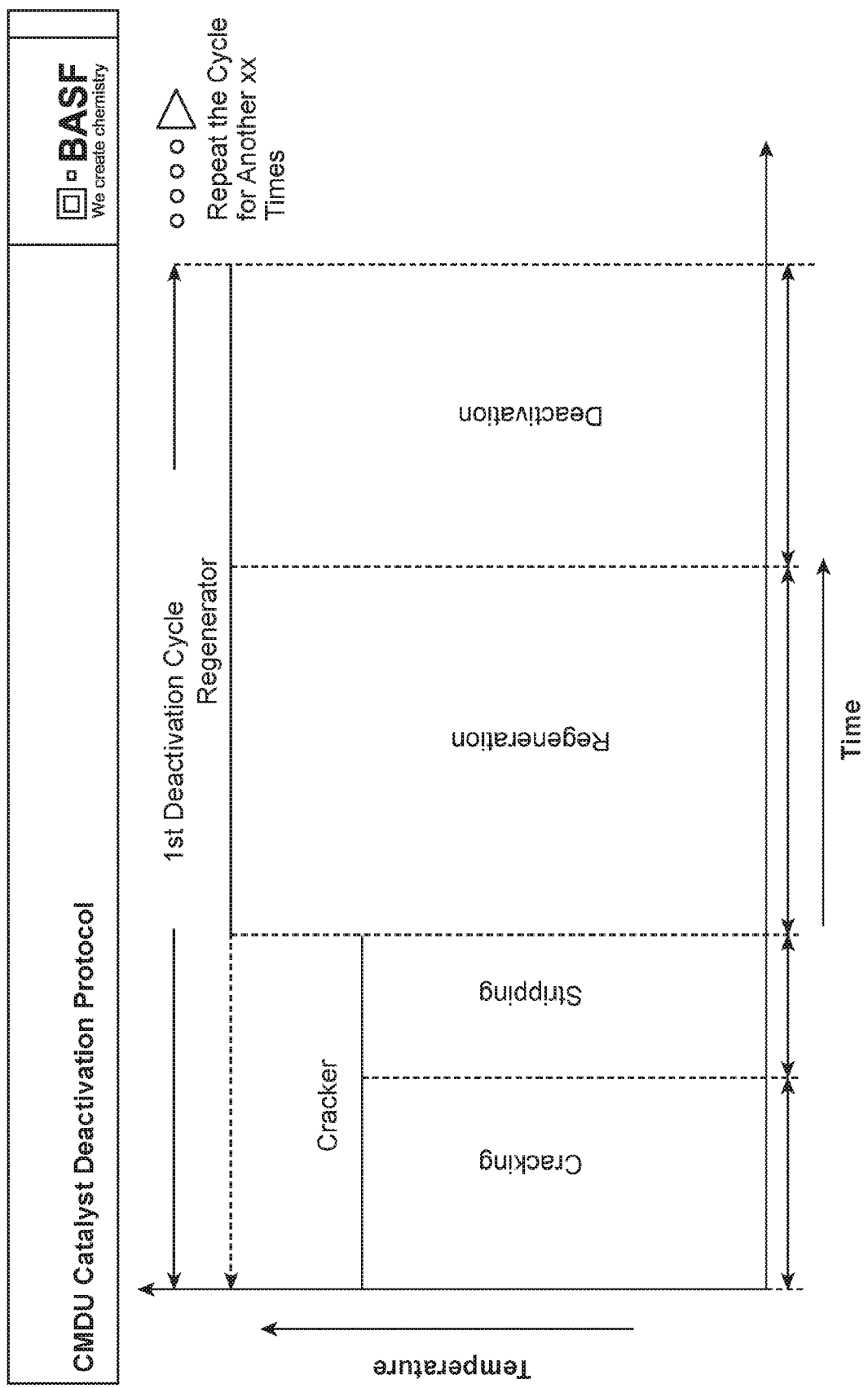
FIG. 1B is a graphical representation of the operational runtime of a cyclic metal deactivation unit, according to an exemplary embodiment.

As shown in FIG. 1B, the processes (e.g., regeneration, deactivation) that take place in the regenerator vessels for each cycle of the system 11 require significant more time to complete than the processes (e.g., cracking, stripping) that take place in the cracker vessel. With the single regenerator design as shown in FIG. 1, the cracker vessel 12 may remain idle for a period of time while the catalyst is being processed by the regenerator vessel 14 in each cycle of the system 10.

Beneficially and as shown in FIG. 1C, the addition of regenerator vessels 13, 15 can shorten or eliminate cracker 12 idle time. Thus, the overall operating time may additionally be decreased with use of more than one regenerator vessel. Comparing the graph for a system with one regenerator vessel (shown as "1R×1C") to the graph for a system with three regenerator vessels (shown as "3R×1C"), the system with three regenerator vessels takes a total of approximately four hours less in overall operating time for a 12 cycles run than the system with only one regenerator vessel. It should be understood that FIG. 1C is illustrative only and various other arrangements and/or outcomes may result from the system.

Figure 2:
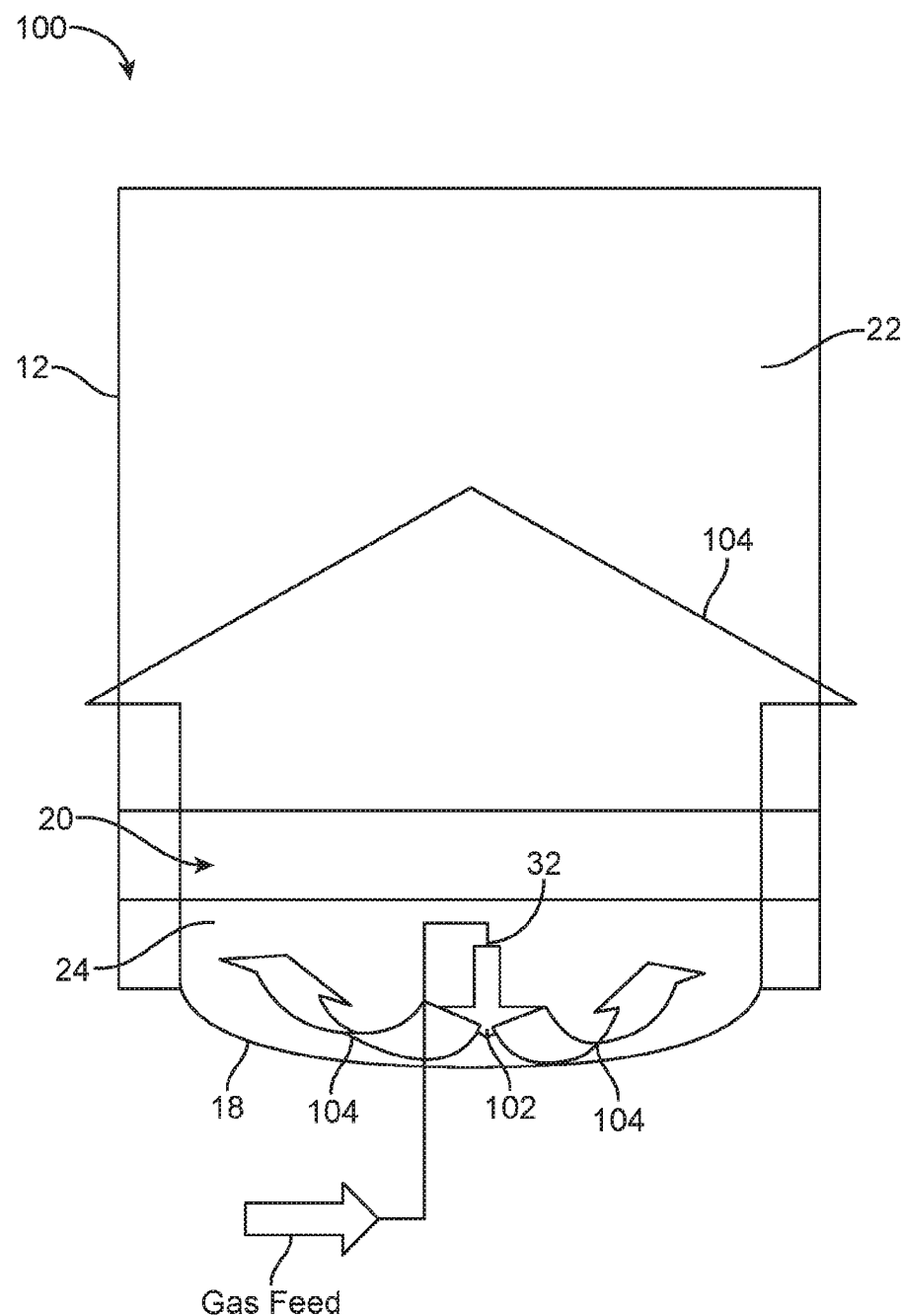
FIG. 2 is a cross-sectional view of a vessel in a fluidization process of FIG. 1, according to an exemplary embodiment.

Referring now to FIG. 2, a fluidization system 100 is shown, according to an exemplary embodiment. The fluidization system 100 is shown as occurring in the cracker vessel 12. In one embodiment, fluidization occurs in the cracker vessel 12. In some other embodiments, fluidization may be performed in the regenerator vessel 14, as well as the cracker vessel 12. Incoming gas 102 may enter the gas redistribution chamber 24 of the cracker vessel 12 at a relatively high velocity. The incoming gas 102 may be redirected through the gas redirector 32 toward the bottom 18 of the chamber 24. The incoming gas 102 is distributed over the cross-sectional area of the cracker vessel 12 and then moves upward to contact the porous plate 20. The redirection of the incoming gas 102 provides a reduction in velocity of the gas 102 and results in a homogeneous distributed gas flow 104 contacting the porous plate 20. The gas flow 104 may then pass through the porous plate 20 and enter the fluidization chamber 22.

Figure 3:
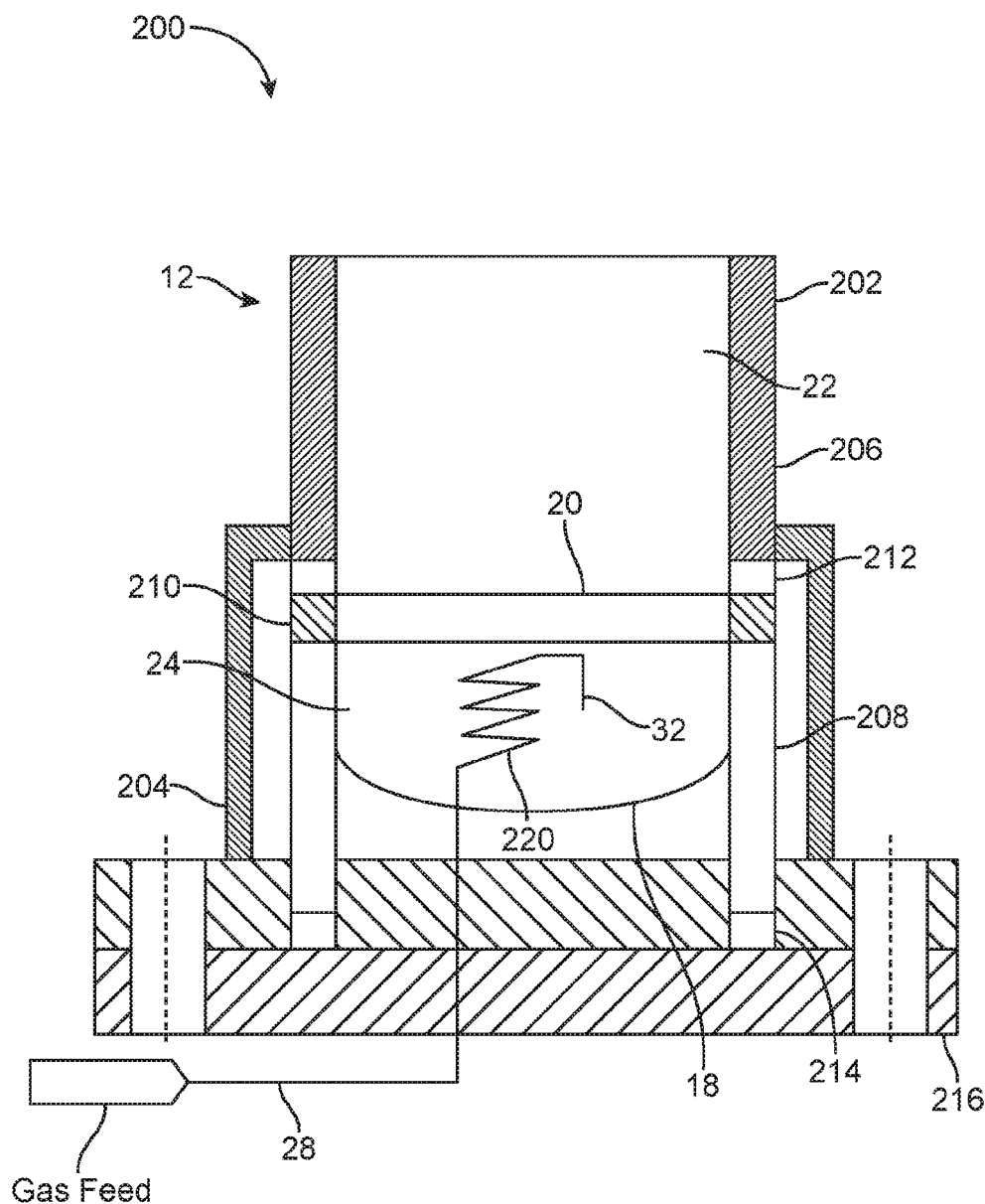
FIG. 3 is a cross-sectional view of a vessel in a gas preheating process of FIG. 1, according to an exemplary embodiment.

Referring now to FIG. 3, a gas preheating system 200 is shown, according to an exemplary embodiment. The gas preheating system 200 is shown as occurring in the cracker vessel 12. Gas preheating may be performed in the cracker vessel 12 and in the regenerator vessel 14. The gas preheating system 200 may include a piping coil 220 positioned inside the gas distribution chamber 24. The gas feed 28 may be preheated inside the piping coil 220 prior to entering the gas redirector 32 for redirection and distribution of the gas.

Referring now to FIGS. 1-3, each of the cracker vessel 12 and the regenerator vessel 14 may include a top portion 202 and a bottom portion 204. The top portion 202 may include top chamber (e.g., fluidization chamber 22, catalyst regeneration chamber 36), enclosed by top chamber walls 206. The bottom portion 204 may include a gas distribution chamber 24 enclosed by gas distribution chamber walls 208. The top chamber walls 206 may be coupled to the gas distribution chamber walls 208 by one or more porous plate mounts 210 and a sealing device 212 separating the top chamber walls 206 from the porous plate mounts 210. The sealing device 212 is configured to seal the top portion 202 of the vessel from the bottom portion 204 of the vessel.

As shown in FIG. 3, the porous plate mounts 210 couple the porous plate 20 to the gas distribution chamber walls 208 and to the top chamber walls 206. In some embodiments, the gas distribution chamber walls 208 may be spring mounted to the vessel bottom flange 216 by springs 214 contacting the vessel bottom flange 216. In other embodiments, the gas distribution chamber walls 208 may be otherwise mounted to the vessel bottom flange 216 by any other means suitable. Each of the springs 214 may provide sufficient force to press the one or more porous plate mounts 210 and the sealing device 212 against the top chamber walls 206, thereby sealing the top portion 202 of the vessel from the bottom portion 204 of the vessel. The sealing device 212 is additionally configured to hold back material in the top chamber (e.g., fluidization chamber 22, catalyst regeneration chamber 36) of the vessel. Additional sealing is provided by the sealing of the vessel bottom flange 216. Unlike the sealing device 212, this additional sealing may provide gas sealing of the vessel bottom flange 216, containing gasses with the gas distribution chamber 24.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

Numerous specific details are described to provide a thorough understanding of the disclosure. However, in certain instances, well-known or conventional details are not described in order to avoid obscuring the description. References to "some embodiments," "one embodiment," "an exemplary embodiment," and/or "various embodiments" in the present disclosure can be, but not necessarily are, references to the same embodiment and such references mean at least one of the embodiments.

Alternative language and synonyms may be used for anyone or more of the terms discussed herein. No special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

The elements and assemblies may be constructed from any of a wide variety of materials that provide sufficient strength or durability, in any of a wide variety of colors, textures, and combinations. Further, elements shown as integrally formed may be constructed of multiple parts or elements.

As used herein, the word "exemplary" is used to mean serving as an example, instance or illustration. Any implementation or design described herein as "exemplary" is not necessarily to be construed as preferred or advantageous over other implementations or designs. Rather, use of the word exemplary is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary implementations without departing from the scope of the appended claims.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

As used herein, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Other embodiments are set forth in the following claims.

What is claimed is:

1. A method of catalyst deactivation, the method comprising:
   cracking, by a cracker vessel, a catalyst;
   regenerating, by a regenerator vessel, the catalyst;
   distributing, by an age distribution vessel, the catalyst based at least in part on an age of the catalyst; and
   transporting, by one or more dip tubes, the catalyst between the cracker vessel, regenerator vessel, and the age distribution vessel to deactivate the catalyst.

2. The method of claim 1, wherein the cracker vessel and the regenerator vessel are in fluid communication with one another via a pneumatic valve system including a first dip tube in the cracker vessel, and a second dip tube in the regenerator vessel.

3. The method of claim 1, wherein the cracker vessel comprises a first porous plate disposed within a lower region of the cracker vessel.

4. The method of claim 3, wherein the first porous plate defines a first gas distribution region including an inner bottom surface of the cracker vessel and a first gas inlet is disposed within the first gas distribution region, wherein the first gas inlet is configured to introduce a first gas source to the cracker vessel.

5. The method of claim 1, wherein the regenerator vessel comprises a second porous plate disposed within a lower region of the regenerator vessel.

6. The method of claim 5, wherein the second porous plate defines a second gas distribution region including an inner bottom surface of the regenerator vessel and a second gas inlet is disposed within the second gas distribution region, wherein the second gas inlet is configured to introduce a second gas source to the regenerator vessel.

7. The method of claim 4, wherein the first gas inlet is fluidly connected to a first gas pipe within the first gas distribution region of the cracker vessel, the first gas pipe comprising a coiled configuration for preheating incoming gas within the first gas distribution region of the cracker vessel.

8. The method of claim 6, wherein the second gas inlet is fluidly connected to a second gas pipe within the second gas distribution region of the regenerator vessel, the second gas pipe comprising a coiled configuration for preheating incoming gas within the second gas distribution region of the regenerator vessel.

\* \* \* \* \*